United States Patent Office 3,499,874
Patented Mar. 10, 1970

3,499,874
CATALYTIC PROCESS FOR PREPARING POLY-β-ALANINE
Yasunobu Takahashi and Yohei Fukuoka, Tokyo, Japan, assignors to Asahi Kasei Kogyo Kabushiki Kaisha, Osaka, Japan
No Drawing. Filed Oct. 17, 1966, Ser. No. 586,924
Claims priority, application Japan, Oct. 27, 1965, 40/65,462; Nov. 10, 1965, 40/68,526; Feb. 11, 1966, 41/7,720; Mar. 24, 1966, 41/17,640
Int. Cl. C08g 20/06
U.S. Cl. 260—78      5 Claims

ABSTRACT OF THE DISCLOSURE

A poly-β-alanine is produced by reacting β-aminopropionitrile with water in liquid phase at a temperature of 10–250° C. The process can be conducted in the presence of catalysts and solvents and in one embodiment includes reaction in the presence of preformed product polymer.

---

This invention relates to a process for preparing poly-β-alanine by polymerizing β-aminopropionitrile in the presence of water.

The β-aminopropionitrile which is used as a starting material in the process of this invention may be obtained by reacting acrylonitrile with ammoniacal water as described in the Industrial Engineering Chemistry, 50, 1115 (1958). In page 1118 of the above-mentioned publication, it is reported that a water soluble polyamide having a low molecular weight was obtained by polymerizing β-aminopropionitrile in the presence of a trace of water, or, under a substantially anhydrous condition, to produce polyamidine compound and subsequently by treating the polyamidine compound thus obtained with water. However, an opaque gel-like polyamide obtained in the process mentioned above was water soluble material having a low molecular weight, of which the chemical structure was not confirmed in the report mentioned above.

An object of this invention is to provide a process for preparing water insoluble poly-β-alanine from β-aminopropionitrile.

In accordance with a first aspect of this invention, there is provided a process for preparing poly-β-alanine by polymerizing β-aminopropionitrile in the presence of more than about equimolar amount of water per mol of β-aminopropionitrile at the time of the initiation of the polymerization reaction. If the amount of water used exceeds 10 mols per mol of β-aminopropionitrile, not only the rate of polymerization is decreased but also leads to the production of the polymer having a low degree of polymerization. Thus, the amount of water is preferably less than 3 mols, and most preferably less than 1.5 mols per mol of β-aminopropionitrile.

In the present process, a reaction temperature of from 10° to 250° C., and most preferably from 60° to 200° C. is used.

If it is desired to prepare poly-β-alanine in the absence of catalyst under blanket of nitrogen stream according to a process involved in a first aspect of this invention, it is necessary to use a higher part of temperature within the range as prescribed above and a prolonged reaction period for several days to several tens of days, which, nevertheless, produce the badly discolored poly-β-alanine having a poor degree of polymerization and an unsatisfactorily low purity.

In order to avoid these drawbacks as described above, a second aspect of this invention provides a process for preparing poly-β-alanine by carrying out the reaction according to the first aspect of this invention in the presence of a catalyst system. By using a catalyst system in the reaction, not only the rate of the polymerization reaction can be remarkably increased but also the reaction period can be greatly shortened. Moreover, the poly-β-alanine obtained has a pure white color and a high degree of polymerization.

Catalysts which may be used in the present process include, for example, oxides of metals of Cu, Ag, Au, Zn, Cd, Hg, Ce, Ge, Sn, Pb, As, Sb, Bi, Mn, Fe, Co, Ni, Pd and Pt, and inorganic and organic acid salts of said metals such as carbonates, cyanates, thiocyanates, chlorides, bromides, iodides, sulfates, nitrates, formates, acetates, oxalates, p-toluenesulfonates, picrates, monochloroacetates and the like; aliphatic or aromatic primary, secondary and tertiary amines and heterocyclic amines such as ethylamine, dibutylamine, triethylamine, dimethylamine, 2,4-toluenediamine, pyridine, 2-picoline, 3-picoline, 4-picoline, 2,6-lutidine, 2,4,6-collidine, 2-methyl-5-ethylpyridine, morpholine and the like; organic and inorganic acid salts of ammonia and the above-mentioned amines, such as carbonates, sulfates, nitrates, hydrobromides, hydrochlorides, hydrogensulfates, phosphates, formates, acetates, oxalates, monochloroacetates, dichloroacetates, monomethylsulfates and the like; tetraalkylammonium salts such as tetramethylammonium hydrochloride, dimethyldiethylammonium hydrobromide and the like; organic and inorganic acids such as hydrochloric acid, hydrobromic acid, nitric acid, sulfuric acid, carbon dioxide, formic acid, acetic acid, monochloroacetic acid, dichloroacetic acid, pyridine carboxylic acids; and ozone, peroxides, hydroperoxides, inorganic peracid salts such as hydrogen peroxide, peracetic acid, benzoyl peroxide, tertiary butylhydroperoxide, potassium persulfate, potassium permanganate and the like.

In the present process, these catalysts exemplified above may be used alone or in the form of a mixture of two or more of these.

The processes described above according to the two aspects of this invention may be carried out in the presence of various solvents, if desired. Solvents which may be preferably used in the processes of this invention include, for example, aromatic hydrocarbons, halogenated aromatic hydrocarbons, ethers, aromatic amines, heterocyclic amines, and the like, such as benzene, toluene, chlorobenzene, xylene, o-dichlorobenzene, dimethylaniline, pyridine, picolines, lutidines, collidines and N-methylmorpholine. In addition to those mentioned above, dialkylformamide, dialkylacetamide, dimethylsulfoxide, tetramethylphosphoramide, tetramethylsulfone and the like may also be used.

In the process according to the second aspect of this invention, catalyst may be charged to a mixture of β-aminopropionitrile and more than equimolar amount of water per mol of the β-aminopropionitrile either by adding the total amount of the catalyst required in the reaction at the time of the initiation of the reaction or by adding portionwise intermittently in the course of the reaction. The catalyst may either be in the form of a solution or of a suspension in a suitable medium. The amount of catalyst used is preferably from 0.0001 to 1 mol per mol of β-aminoproprionitrile.

The products obtained in the processes described above are finely divided, successively washed with alcohol, cold and hot water, and dried.

The products thus obtained were identified to be poly-β-alanine by an infrared absorption spectrum, an elementary analysis, the formation of β-alanine by hydrolysis and paper chromatographic analysis thereof. The viscosity of the poly-β-alanine was measured by dissolving 0.1 g. of the dried polymer in 10 ml. of dichloroacetic acid or formic acid at 35° C.

In order to increase the yield of water insoluble poly-

β-alanine and the rate of polymerization, the processes according to a third and a fourth aspect of this invention as described hereinafter are extremely effective.

The process according to the third aspect of this invention comprises reacting β-aminopropionitrile with more than an equimolar amount of water in the presence of a reaction mixture containing poly-β-alanine obtained in the process according to the second aspect of this invention as a catalyst in the present process.

Although no particular restriction is imposed on the reaction mixture used as a catalyst, in general, a reaction mixture containing poly-β-alanine having relatively lower degree of polymerization, e.g. a reduced specific viscosity of less than 0.05, may be conveniently used because of the compatibility thereof to β-aminopropionitrile and the good dispersibility therein.

Since poly-β-alanine having a reduced specific viscosity of higher than 0.05 usually takes the form of solid or gel-like solid, it is necessary to disperse it thoroughly into the reactant mixture containing β-amino-propionitrile by grinding, kneading and stirring when using a reaction mixture containing such poly-β-alanine as a catalyst.

The amount of the reaction mixture containing poly-β-alanine used is preferably from 0.0001 to 10 parts by weight per part by weight of β-aminopropionitrile to be polymerized in this process. The process according to the third aspect of this invention explained above may, of course, be carried out in the presence of solvent as exemplified above.

The catalyzing effects of the catalyst used in the process according to the third aspect of this invention are as much as or more than 100 times than that of the process according to the second aspect of this invention at a given amount of catalyst. Furthermore, since a smaller amount of catalyst may be required in the present process to obtain a given catalyzing effect, the purification of the poly-β-alanine and the subsequent operations such as spinning may be made much easier. This gives, as a result, a great advantage from a commercial point of view in that poly-β-alanine having better physical properties may be obtained, which, in turn, leads to the production of shaped articles, for example, fibers having excellent physical properties.

Another process according to a fourth aspect of the present invention enables a great increase in the yield of hot water insoluble poly-β-alanine having a high degree of polymerization.

Although water soluble poly-β-alanine oligomer having a low degree of polymerization has various utilities in itself, the formation thereof is rather undesirable in the commercial production of high molecular weight poly-β-alanine.

Thus, the present process according to a fourth aspect of this invention comprises heating poly-β-alanine obtained in the processes according to the preceding aspects of this invention in a closed vessel at a temperature of from 80° to 250° C., and most preferably from 120° to 200° C. for more than an hour, and most preferably 24 to 200 hours, under an elevated pressure in the presence of sufficient amount of water to jump the molecular weight of said poly-β-alanine up to a higher degree. The supply of water to the reaction system may either be accomplished by steam alone or by a mixture consisting of steam and an inert gas. Further, if desired, the reaction may be carried out by suspending poly-β-alanine in a suitable organic solvent as mentioned hereinbefore.

In accordance with the present process, the hot water insolubles contained in the product poly-β-alanine may be increased to more than 90% and also the average reduced specific viscosity of the product may be increased to more than 0.2.

These processes according to the first through the fourth aspects of this invention as illustrated above produce poly-β-alanine having a higher degree of polymerization in a more stabilized fashion as compared with prior art processes for preparing poly-β-alanine from acrylamide or ethylenecyanohydrin.

Poly-β-alanine obtained according to the processes of this invention may be used as a starting material for producing fibers, films and other shaped articles which are commercially useful.

The following examples will serve to illustrate the processes of this invention more practically. However, it should not be construed that these examples restrict this invention as they are given merely by way of illustration.

EXAMPLE 1

A mixture consisting of 7 g. of β-aminopropionitrile and 1.8 g. of water was allowed to stand still for 15 days at 33° C. and a lactescent solid was obtained. The solid thus obtained was washed with methanol and hot water, and dried to give 0.6 g. of white solid. An infrared absorption spectrum of the solid showed the disappearance of absorptions at 1605 cm.$^{-1}$ (primary amine) and 2300 cm.$^{-1}$ (nitrile group), and an absorption at 1640 cm.$^{-1}$ (amide group) was observed. Values of an elementary analysis were C, 50.11%; H, 7.28% and N, 20.04%. Calculated values for poly-β-alanine $(C_3H_7ON)_n$ were C, 50.69%; H, 7.09% and N, 19.71%.

Further, 0.3 g. of the product polymer was hydrolyzed with 5 ml. of concentrated hydrochloric acid at 120° C. for 2 hours and after the resulting product was neutralized and concentrated, paper chromatographic analysis was conducted by using phenol-water system. As a result, the Rf was 0.61 which coincided with that of β-alanine developed at the same time. The polymer had a reduced specific viscosity of 0.17 as measured by dissolving 0.1 g. of the product polymer in 10 ml. of dichloroacetic acid.

EXAMPLES 2–14

Example 1 was repeated according to the same procedures as described therein except that various amounts of β-aminopropionitrile, water and catalyst, various types of catalyst as specified in the following table, and various reaction temperatures and periods also as specified in the following table were employed. The resulting reaction mixtures were treated according to the same procedures as in Example 1 and the yields and reduced specific viscosities of the products poly-β-alanine were measured, respectively. The results are shown in the following table:

| Example No. | β-Aminopropionitrile, g. | Water, g. | Catalyst | Mg. | Reaction temperature, °C. | Reaction period | Yield, g. | Reduced specific viscosity η sp./c |
|---|---|---|---|---|---|---|---|---|
| 2 | 14 | 5 | $SnCl_2 \cdot 2H_2O$ | 25 | 40 | 3 days | 5.8 | 0.37 |
| 3 | 14 | 13 | $Fe_2(SO_4)_3$ | 1.4 | 75–80 | 2 days | 4.4 | 0.35 |
| 4 | 14 | 4.0 | | | 230–240 | 7 days | 2.1 | 0.18 |
| 5 | 14 | 3.9 | $Hg(CH_3COO)_2$ | 10 | 20 | 3 days | 5.9 | 0.42 |
| 6 | 28 | 10 | $CuCl_2$ | 5 | 40 | 50 hours | 12.6 | 0.36 |
| 7 | 28 | 10 | $SbCl_3$ | 40 | 37 | 60 hours | 12.1 | 0.36 |
| 8 | 28 | 14 | $Hg(CH_3COO)_2$ | 28 | 50 | 55 hours | 13.1 | 0.40 |
| 9 | 28 | 13 | $Bi(NO_3)_3 \cdot 5H_2O$ | 15 | 30 | 50 hours | 9.4 | 0.29 |
| 10 | 28 | 10 | $Ce(NO_3)_3 \cdot 2NH_4NO_3$ | 20 | 50 | 55 hours | 8.9 | 0.27 |
| 11 | 14 | 3.9 | $KMnO_4$ | 10 | 20 | 3 days | 4.4 | 0.34 |
| 12 | 14 | 5 | $ZnCO_3$ | 5 | 40 | do | 6.0 | 0.41 |
| 13 | 14 | 5 | $Hg(SCN)_2$ | 8 | 40 | do | 6.4 | 0.43 |
| 14 | 14 | 5 | $ZnO$ | 10 | 40 | do | 6.2 | 0.40 |

EXAMPLES 15–29

A mixture consisting of 14.0 g. of B-aminopropionitrile, various amounts of water and various types and amounts of catalysts as specified in the following table was subjected to the polymerization reactions at 32° C. for 240 hours in a nitrogen atmosphere and the time required for the product to solidify, the yield of dried polymer obtained by washing the crude polymer with cold and hot water and methanol followed by drying, and the reduced specific viscosities of the dried polymer as measured by dissolving 0.1 g. of the same in 10 ml. of dichloroacetic acid are shown in the following table.

As controls, Examples 15 and 16 show the results obtained without using any catalyst.

EXAMPE 39

A mixture consisting of 70 g. of $\beta$-aminopropionitrile and 18 g. of water was allowed to stand still at 30–35° C. for 18 days and a lactescent gel-like solid was obtained. The solid was transferred to a 200 cc. autoclave and 3 g. of water was added further thereto and the resulting mixture was treated in the wetted condition at 120° C. for 15 days under an elevated pressure involving the initial pressure of 10 kg./cm.$^2$ by nitrogen.

After the completion of the reaction, the autoclave was unsealed to take out the polymerization product, which was then crushed and treated with hot water, and the insolubles thus obtained were dried to give 49 g. of dried polymer.

| | Example Nos. | | | | | | | | | | | | | | |
|---|---|---|---|---|---|---|---|---|---|---|---|---|---|---|---|
| | 15 | 16 | 17 | 18 | 19 | 20 | 21 | 22 | 23 | 24 | 25 | 26 | 27 | 28 | 29 |
| $\beta$-Aminopropionitrile, g | 14.0 | 14.0 | 14.0 | 14.0 | 14.0 | 14.0 | 14.0 | 14.0 | 14.0 | 41.0 | 14.0 | 14.0 | 14.0 | 14.0 | 14.0 |
| Water, g | 8.0 | 12.0 | 6.0 | 6.0 | 6.0 | 8.0 | 6.0 | 6.0 | 6.0 | 6.0 | 6.0 | 6.0 | 6.0 | 6.0 | 6.0 |
| Type of catalyst | | | (1) | (2) | (3) | (4) | (5) | (9) | (7) | (7) | (8) | (9) | (10) | (11) | (12) |
| Amount of catalyst, mg | | | 10.0 | 10.0 | 10.0 | 13.0 | 13.0 | 2.0 | 2.0 | 0.4 | 10.0 | 2.0 | 10.0 | 5.0 | 10.0 |
| Time required for solidifying, hr | 305 | 377 | 54 | 77 | 79 | 62 | 63 | 46 | 42 | 49 | 51 | 64 | 83 | 47 | 72 |
| Yield of dried polymer, g | 0 | 0 | 3.1 | 2.8 | 3.7 | 3.1 | 4.0 | 5.3 | 6.0 | 6.1 | 4.4 | 4.1 | 4.7 | 4.4 | 4.2 |
| Reduced specific viscosity | | | 0.29 | 0.25 | 0.32 | 0.29 | 0.30 | 0.41 | 0.37 | 0.34 | 0.34 | 0.31 | 0.29 | 0.28 | 0.24 |

1 Ammonium fluoride.
2 Ammonium rhodanate.
3 Dimethyl aniline.
4 Dimethylaniline hydrochloride.
5 $\alpha$-picolinedichloroacetate.
6 Peracetic acid.
7 Hydrogen peroxide.
8 Benzoyl peroxide.
9 Tertiary butyl hydro peroxide.
10 Tri-n-butyl amine.
11 Potassium persulfate.
12 Pyridine.

EXAMPLES 30–38

A mixture consisting of 8.0 g. of $\beta$-aminopropionitrile, 2.0 g. of water and 10 mg. of various types of catalyst as specified in the following table shown as (A) therein or 1.0 g. of poly-$\beta$-alanine shown as (B) therein, as a catalyst, was subjected to the polymerization reactions at 15° C. for 42 hours in a nitrogen stream and the conversion, yields and reduced specific viscosities of the respective product polymers were measured.

Poly-$\beta$-alanine shown as (B) in the table mentioned above which was used as a catalyst consisted mainly of water soluble polymer and it was prepared by reacting 8.0 g. of $\beta$-aminopropionitrile with 2.0 g. of water at 45° C. for 30 hours in a nitrogen atmosphere in the presence of 10 mg. of catalyst shown as (A) in each example.

The yields mentioned above and shown in the table were measured by weighing the dried water insoluble polymers obtained by heating the crude polymer at 45° C. for an additional 48 hours, treating the resulting polymer with hot water and drying.

The reduced specific viscosities referred to in the table were measured by dissolving 0.1 g. of the dried polymers in dichloroacetic acid.

The dried polymer had a reduced specific viscosity of 0.24 as measured by dissolving 0.1 g. of the same in 10 cc. of dichloroacetic acid.

EXAMPLE 40

A mixture consisting of 70 g. of $\beta$-aminopropionitrile, 20 g. of water and 0.1 g. of ammonium sulfate was allowed to stand still at 28–35° C. for 50 hours and a lactescent wax-like solid was obtained. The solid thus obtained was transferred to an autoclave and after adding 2.0 g. of water thereto, the content was treated in the wetted condition at 180° C. for 5 days under seal. After the completion of the reaction, the autoclave was unsealed to take out the polymerization product, which was crushed and treated with hot water, and insolubles were dried to give 79 g. of dried polymer. The dried polymer had a reduced specific viscosity of 0.32.

EXAMPLE 41

A mixture consisting of 140 g. of $\beta$-aminopropionitrile, 50 g. of water and 0.2 g. of 40% peracetic acid was heated in an autoclave at 60°–65° C. for 46 hours to give a lactescent solid. The product solid was finely divided and charged in a tubular heater provided with a jacket and, while maintaining the jacket temperature at 170° C., an

| Example No. | Type of catalyst | Amount of catalyst based on the weight of $\beta$-amino-propionitrile and water charged, percent | Conversion after 42 hrs. from the starting of reaction | Water insoluble polymer | |
|---|---|---|---|---|---|
| | | | | Yield, g. | Reduced specific viscosity |
| 30 | A, ammonium carbonate | 0.1 | <2 | 1.9 | 0.21 |
| | B, poly-$\beta$-alanine | 0.01 | 28 | 3.7 | 0.27 |
| 31 | A, cupric chloride | 0.1 | 7 | 2.6 | 0.25 |
| | B, poly-$\beta$-alanine | 0.01 | 43 | 4.6 | 0.37 |
| 32 | A, cobalt acetate | 0.1 | <2 | 1.7 | 0.19 |
| | B, poly-$\beta$-alanine | 0.01 | 15 | 3.4 | 0.23 |
| 33 | A, potassium permanganate | 0.1 | <2 | 1.3 | 0.14 |
| | B, poly-$\beta$-alanine | 0.01 | 11 | 3.5 | 0.25 |
| 34 | A, monochloroacetic acid | 0.1 | 3 | 2.8 | 0.24 |
| | B, poly-$\beta$-alanine | 0.01 | 24 | 4.4 | 0.30 |
| 35 | A, hexamethylenediamine carbonate | 0.1 | <2 | 2.4 | 0.18 |
| | B, poly-$\beta$-alanine | 0.01 | 15 | 3.8 | 0.23 |
| 36 | A, 50% peracetic acid | 0.1 | <2 | 2.5 | 0.25 |
| | B, poly-$\beta$-alanine | 0.01 | 32 | 4.1 | 0.36 |
| 37 | A, 33% hydrogen peroxide | 0.1 | 3 | 3.0 | 0.20 |
| | B, poly-$\beta$-alanine | 0.01 | 28 | 4.3 | 0.41 |
| 38 | A, dimethylaniline | 0.1 | <2 | 2.8 | 0.22 |
| | B, poly-$\beta$-alanine | 0.01 | 21 | 4.1 | 0.34 | overheated steam heated to a temperature of 170° C. in a preheater was allowed to pass therethrough for about 100 hours. After the polymer was dried and treated with hot water, the insolubles were dried to give 158 g. of dried polymer having a reduced specific viscosity of 0.40.

EXAMPLE 42

A mixture consisting of 70 g. of β-aminopropionitrile, 18.2 g. of water and 350 mg. of zinc dichloride as a catalyst was allowed to stand still for 60 hours and a lactescent gel-like solid was obtained. The solid was found to have a reduced specific viscosity of 0.08. To each portion of 1.0 g. of solid thus obtained was added 1 ml. each of solvents as specified in the following table, respectively, and the resulting mixture was allowed to stand still in a sealed tube at 170° C. for 40 hours.

At the end of the period, the tube was unsealed and the polymerization product was filtered and washed with methanol, cold and hot water followed by drying to give solid products. The results are shown in the following table:

| Type of solvent | Yield of water insoluble polymer, percent | Reduced specific viscosity, ηsp./c. |
| --- | --- | --- |
| (1) m-Xylene | 85 | 0.28 |
| (2) Hexamethylphosphoramide | 96 | 0.21 |
| (3) o-Dichlorobenzene | 96 | 0.28 |
| (4) Dimethylsulfoxide | 77 | 0.20 |
| (5) Dimethylformamide | 88 | 0.35 |
| (6) N-methylmorpholine | 93 | 0.34 |
| (7) Pyridine | 96 | 0.32 |
| (8) m-Cresol | 86 | 0.30 |

EXAMPLE 43

A mixture consisting of 7 g. of β-aminopropionitrile, 1.82 g. of water, 0.035 g. of zinc dibromide, as a catalyst, and 9 ml. of solvent as specified in the following table was reacted at 170° C. for 40 hours in a nitrogen stream.

To the reaction mixtures were added 20 ml. of methanol and the polymerization products were filtered and washed with cold and hot water and dried to give white solids.

The results are given in the following table:

| Type of solvent | Yield of water insoluble polymer, percent | Reduced specific viscosity, ηsp./c. |
| --- | --- | --- |
| (1) Dimethylformamide | 53 | 0.25 |
| (2) Dimethylphosphoramide | 62 | 0.18 |
| (3) N-methylmorpholine | 100 | 0.28 |
| (4) γ-Picoline | 82 | 0.25 |
| (5) Chlorobenzene | 87 | 0.23 |
| (6) Dimethylaniline | 82 | 0.21 |
| (7) 1,2,4-trichlorobenzene | 87 | 0.20 |

What we claim is:

1. Process for preparing solid polymeric poly-β-alanine which comprises reacting in liquid phase β-amino-propionitrile with water in the presence of a catalyst at a temperature of from 10 to 250° C., the amount of water used being in excess of about 1 mol and up to 10 mols per mol of β-aminopropionitrile, said catalyst being used in the amount of 0.0001 to 1 mol per mol of β-aminopropionitrile, said catalyst being at least one member selected from the group consisting of oxides of Cu, Ag, Au, Zn, Cd, Hg, Ce, Ge, Sn, Pb, As, Sb, Bi, Mn, Fe, Co, Ni, Pd and Pt, inorganic and organic acid salts of said metals, aliphatic and aromatic primary, secondary and tertiary amines, heterocyclic amines, organic and inorganic acid salts of ammonia and the above mentioned amines, tetraalkyl ammonium salts, organic and inorganic acids, ozone, peroxides, hydroperoxides, and inorganic peracid salts.

2. A process according to claim 1, wherein the reaction is carried out in the presence of an amount of preformed poly-β-alanine which is sufficient to increase the rate of the reaction, said preformed poly-β-alanine having been prepared by reacting in liquid phase β-amino-propionitrile in water at 10 to 250° C. in the presence of a catalyst as defined in claim 1, the amount of water being in excess of about 1 mol and up to about 10 mols per mol of β-amino-propionitrile.

3. A process according to claim 2, wherein said preformed poly-β-alanine has a reduced specific viscosity of less than about 0.05 as determined by dissolving 0.1 gram of the polymer in 10 ml. of dichloroacetic acid at 35° C.

4. Process according to claim 1 wherein said preformed poly-β-alanine is used in an amount of from 0.0001 to 10 parts by weight per part by weight of β-aminopropionitrile.

5. Process according to claim 1 wherein the reaction is carried out in a solvent selected from the group consisting of aromatic hydrocarbons, halogenated aromatic hydrocarbons, ethers, aromatic amines, heterocyclic amines, dialkylformamide, dialkylacetamide, dimethylsulfoxide, tetramethylphosphoramide and tetramethylsulfone.

References Cited

UNITED STATES PATENTS

| 2,071,253 | 2/1937 | Carothers | 260—78 |
| 2,245,129 | 6/1941 | Greenewalt | 260—78 |
| 2,691,643 | 10/1954 | Chirtel et al. | 260—78 |
| 2,301,964 | 11/1942 | Martin | 260—239 |
| 2,357,484 | 9/1944 | Martin | 260—239 |

HAROLD D. ANDERSON, Primary Examiner

U.S. Cl. X.R.

260—31.2, 857